Figure 1:
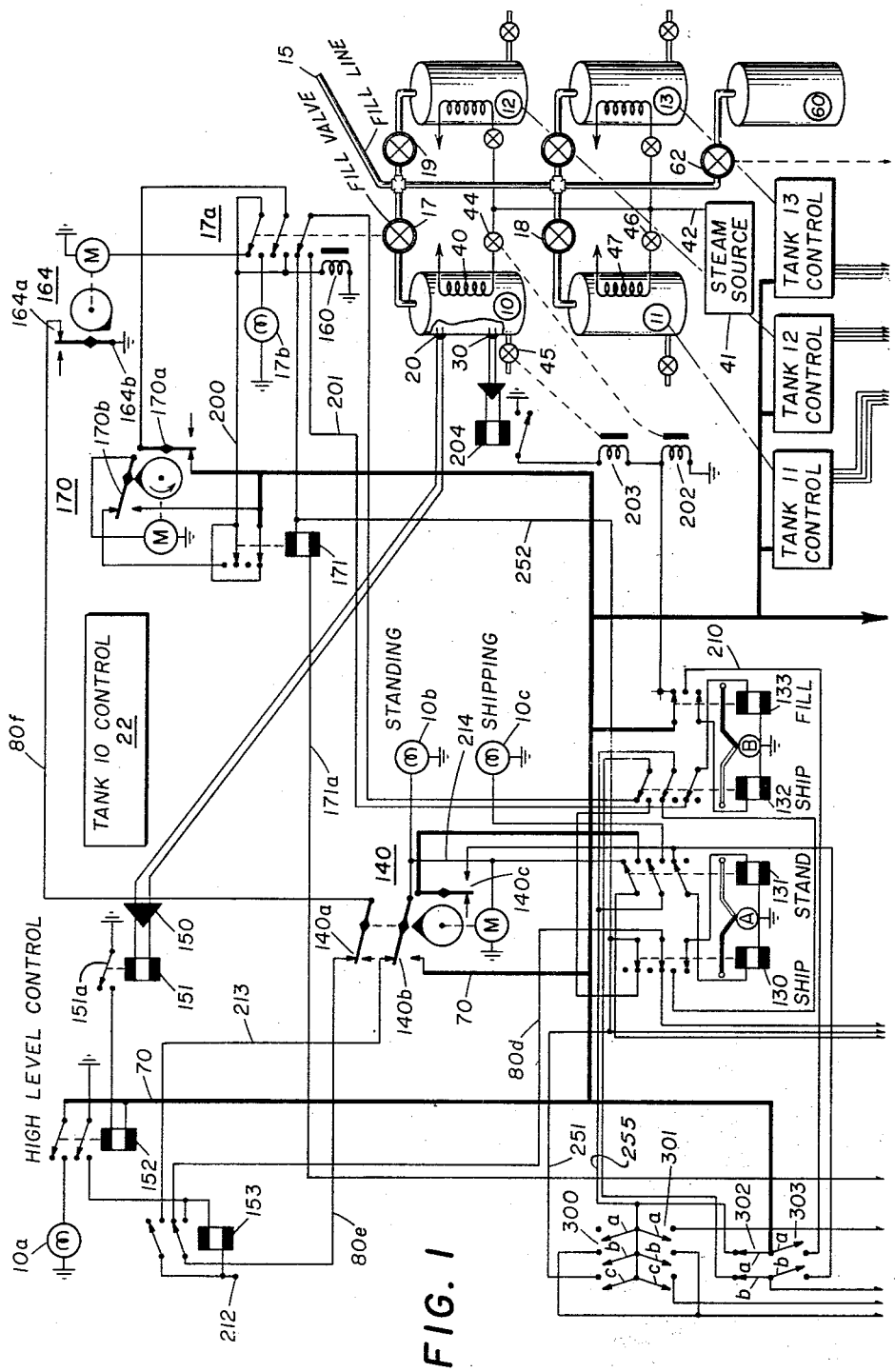

United States Patent Office 3,151,625
Patented Oct. 6, 1964

3,151,625
TANK BATTERY FILL CONTROL
William G. Keeney, Jr., Paso Robles, Calif., assignor to Socony Mobil Oil Company, Inc., a corporation of New York
Filed Aug. 1, 1962, Ser. No. 214,135
12 Claims. (Cl. 137—121)

The invention relates to a system for controlling fluid flow into storage tanks and more particularly to the automatic selection of one or more tanks in a tank battery for delivery of fluids from a supply line.

In operating an oil field, flow lines from one or more wells lead to a tank battery where a plurality of tanks are located to receive and store temporarily the produced fluids. In many operations it is necessary to condition the fluid before sale thereof in order to eliminate undesirable constituents such as water and other sediments which ordinarily will settle out of the produced fluid if it is permitted to stand for a period of time. While production preferably is continuously maintained, it is desirable to eliminate the necessity for continuous surveillance by an attendant at a production tank battery. Various systems have been provided automatically to maintain custody of production at a tank battery as well as the automatic transfer to a purchaser's lines. However, there remains the desirability of a fail safe system which will automatically accumulate fluids in tanks located in the battery in such a manner as to insure proper treatment thereof before delivery to a purchaser as well as to make certain that all of the production available will be properly received without waste and without interruption of flow from the wells involved. Also to be avoided is application to wells feeding the supply line of undesirable back pressures due to automatic shut-in conditions such as characterize many prior art systems.

In accordance with the present invention, there is provided a flow control system for a tank battery wherein each of a plurality of tanks is connected to a common supply line by way of a valve having an operator. A separate energizing channel is provided for each of the operators with each energizing channel operable when in a fill condition for transmission of energy to its operator to open a valve. A search means is provided for sequentially sensing the condition in each of the separate energizing channels and is responsive when it encounters fill condition to apply energy to a first operator to initiate flow to a first tank. Each tank is provided with sensing means for indicating a full condition. Control means is then provided which is responsive to the sensing means at full condition to actuate the search means to seek an energizing circuit having a fill condition, to de-energize the operator for the first tank and to control a conditioning interval for contents of the first tank.

In a more specific aspect, the system is operated from an electrical source with a search means including a stepping relay having a first input circuit connected to the electrical source and a separate output circuit leading to each operator. Power may then be applied sequentially to the output circuits. The stepping relay has a second circuit for controlling its actuating power. An operator control circuit including auxiliary relays leads to each operator, controlling application of power to the operator. A circuit including the auxiliary relays and latching relays is connected to the stepping relay for energizing the auxiliary relays. A timer is energized in response to full condition in a given tank for modifying the state of the second circuit in the stepping relay to change the conductive path leading from the first stepping relay input circuit to a second of the separate output circuits. A switch means in the first separate output circuit is then actuated by the timer a predetermined interval after actuation of the stepping relay to interrupt actuation of power to the operator associated therewith to close its valve after opening of a valve leading to a second tank. Upon actuation of the stepping relay, a second timer is energized to fix a conditioning period during which contents of the tank at full condition are treated.

Figure 2:
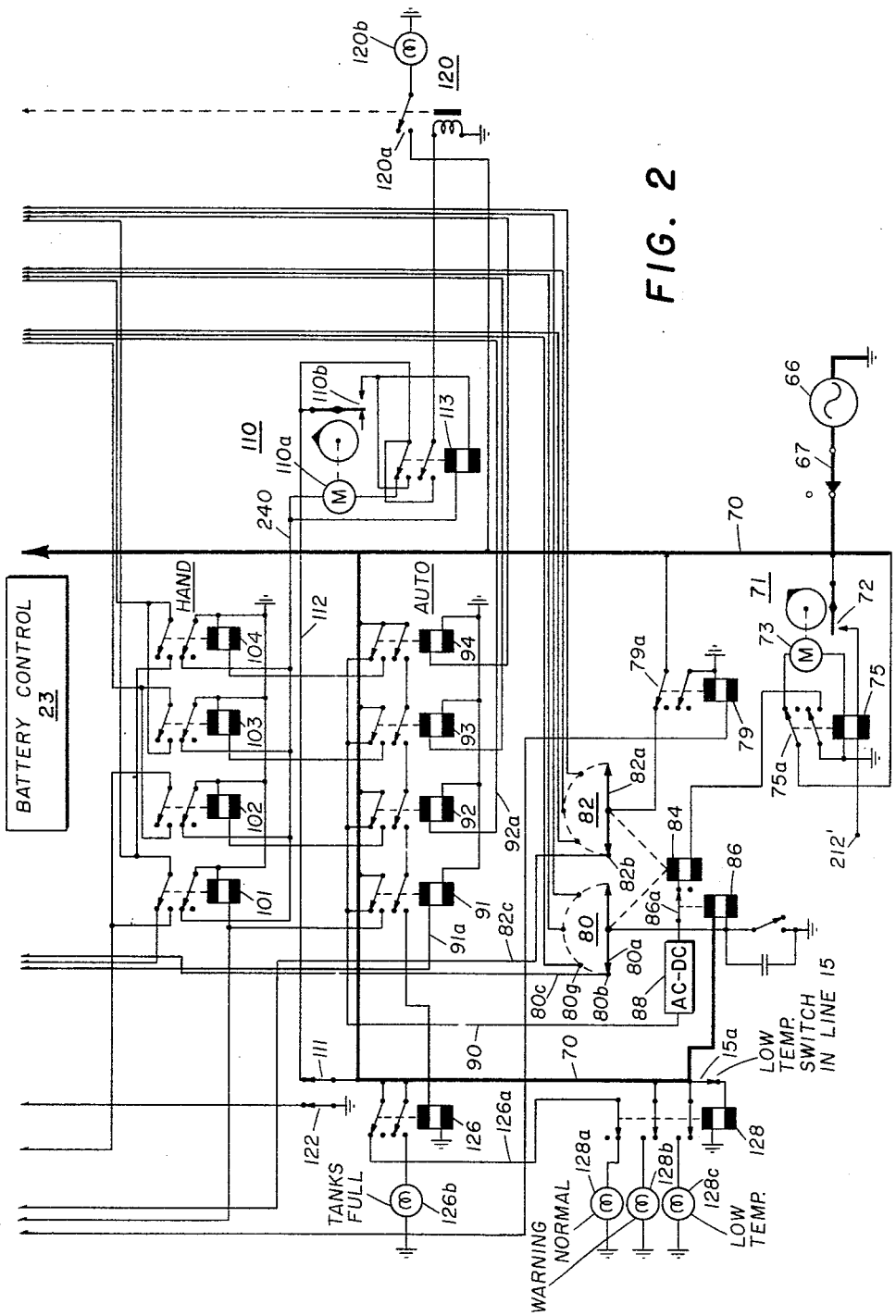

For a more complete understanding of the present invention and for further objects and advantages thereof, reference may now be had to the following description taken in conjunction with the accompanying drawings in which:

FIGURES 1 and 2 illustrate an embodiment of the invention and include a tank search system common to all tanks in the battery and details of a control unit for one tank in the battery.

Referring now to the drawings, there is illustrated in FIGURE 1 a tank searching system which is provided for selecting an empty tank from a tank battery and for switching from the latter tank when filled to another empty tank. FIGURE 2, which completes the system partially shown in FIGURE 1, illustrates a tank battery including tanks 10–13. A supervisory control for tank 10 is shown in some detail with the similar supervisory controls for tanks 11–13 shown in block form only.

For the purpose of the present description, the representative system includes four tanks 10, 11, 12, and 13 with an overflow tank 60 to store production from one or more wells. Production flows by way of line 15 and an open valve 17 into tank 10. The valves leading to tanks 11–13 and 60 are closed. The production continues to flow into tank 10 until a predetermined level is attained as sensed by a liquid level detector 20. The detector 20 is connected by the Tank 10 Control unit 22. Unit 22 responds to close the valve 17. The control system including the detector 20 and the unit 22 is such that a control function is generated immediately upon liquid in tank 10 reaching the level of detector 20. However, a time delay is introduced so that the valve 18 opens before valve 17 closes to maintain the flow in line 15 while changing to empty tank 11.

The tank 11 now begins to receive production while the liquid in tank 10 undergoes gravity separation with the entrained water and sediments slowly settling to the bottom thereof. The water level within the tanks is detected by detector 30 which may be of the conductivity type. Responsive to detector 30, a signal is produced when water accumulates to a predetermined depth in the bottom of the tank 10. Valve 45 is opened under control of unit 22 which responds to detector 30 to bleed water from tank 10. Each of the tanks 10–13 has a water-oil interface detector, only one of which, the detector 30, is shown.

Associated with each of the tanks 10–13 is a heating unit for use when low viscosity fluids encountered in some petroleum provinces are produced. The heating system includes a steam heating coil such as coil 40 placed in each tank in contact with the liquid therein and supplied from a source of steam 41 by way of a steam pipeline 42. The flow of steam through the heating coil 40 is under control of a valve 44. Valve 44 is synchronized with the opening of the valve 17. When the valve 17 is opened to initially admit fluid into the tanks 10 and 11, the steam valve 44 opens to circulate steam through the heating coil 40, thereby maintaining the temperature of the liquid flowing into the tank 10. When the valve 17 is closed at the end of the filling cycle, the steam valve 44 remains open.

When the fluid that has been gathered in the tanks 10 and 11 has settled sufficiently, it is delivered to a pipeline (not shown). When tank 11 has completed its filling cycle, the valve 18 will close after a similar valve leading to an empty tank has been opened. Similarly, a valve 46 which previously was opened with the opening of valve 18 to admit steam into a heating coil 47 in tank 11 is now also closed.

If there is a failure in the system, as when a valve leading to an empty tank fails to open, excessive back pressure would build up in a conventional system to modify the flow in line 15. In order to avoid such an occurrence, there is provided an overflow tank 60 which is connected to line 15. Flow to tank 60 is controlled by valve 62. Valve 62 is normally closed. However, upon occurrence of selected alarm conditions within the system, the valve 62 is opened for flow from line 15 into the tank 60. Such flow will continue until the condition giving rise to the alarm is alleviated.

One alarm condition is a failure of the supply of electrical power, whereupon various valves, pumps, and the like are inoperative. The valve 62 is mechanically biased open but is maintained normally closed by power from the supply source so that upon failure of power, valve 62 will open.

Selection of tanks is under control of a stepping relay system which hunts for an empty tank. Normally, the tanks 10–13 are filled and emptied in sequence. However, conditions may prevail where a tank to be filled has not previously been emptied. In this case the stepping relays will continue to hunt for an empty tank. Further, provision is made by the selector switches to bypass any given tank or tanks in order to perform repair service without interfering with the production program.

More particularly, the system illustrated in the drawings derives its power from an alternating current source 66 which is connected, for convenience of reference, at one terminal to ground and at the other terminal to a master switch 67. The switch 67 leads to the main power bus in the tank battery control unit 23 which also extends to the tank control unit 22. It also extends to Tank 11 Control unit, Tank 12 Control unit, and Tank 13 Control unit. The latter units are illustrated in block form and will each include components shown in detail in unit 22. Since the circuits in the latter units are substantially the same as those in unit 22, only the unit for tank 22 will be described in detail. For the purpose of this description it will also be assumed that all of tanks 10–13 are initially empty.

The power bus 70 leads from switch 67 and is connected to a timing device 71 which serves to close the switch contact 72 after a time delay of about one minute. The delay device 71 is a time clock device driven by a motor 73. Motor 73 is connected to the upper terminals on a double pole, double throw relay 75. A like relay 79 also serves to connect the bus 70 to one arm of a stepping relay having two selector arms for control of two separate circuits. More particularly, the selector arm 82a in the feed section 82 is connected by way of relay arm 79a to the bus 70. A second section, a control section 80, of the stepping relay is also provided. Both of the relay sections 80 and 82 are searched by driving the armatures 80a and 82a under the control of a relay coil 84. The coil 84 is energized under control of a relay 86 from a rectifier 88. The input of the rectifier is fed from the power bus 70 by way of conductor 90 which leads to an output bus associated with four automatic search control relays 91–94. The relay 91 is energized by way of conductor 91a, the second terminal of the relay 91 being connected to ground. The conductor 91a leads to the Tank 10 Control unit 22. Similarly, the relays 92, 93, and 94 are energized from Tank 11 Control unit, Tank 12 Control unit, and Tank 13 Control unit, respectively. The relays 91–94 operate in conjunction with the tank control units and with the stepping relays 80–82 automatically to search for an empty tank and then to initiate the flow of liquid thereinto.

The Battery Control unit 23 also includes a timing clock unit 110 which is energized from the power bus 70 by way of a switch 111 and conductor 112 and to circuit contact in the control relay 113. Contacts to the latter relay are connected to one terminal of the motor winding 110a. The other terminal of winding 110a is connected into the contacts associated with each of relays 101–104 located immediately above the bank of relays 91–94. The operation of the timer 110 is such that a valve operator 120 is normally in an energized state so that the valve 62 leading to the overflow tank 60 normally is maintained closed. Consequently, switch 120a normally is open and the signal light 120d normally is de-energized.

De-energization of the valve operator 120 will permit the valve 62 to be mechanically closed by self-biasing means. If power is available, switch 120a closes, turning on the alarm light 120b.

A manually operable switch 122 in the unit 23 permits an operator to place the system in condition for automatic operation.

Further, in unit 23 the power bus 70 leads to the upper contacts in a double pole, double throw signal relay 126 to feed power by way of conductor 126a to the upper terminals in a triple pole, double throw relay 128. The bus 70 also is fed directly to the two lower contacts on relay 128 which lead to suitable signal lamps. The coil of relay 128 has one terminal connected to ground and the other terminal connected by way of a switch 15a to the bus 70. Switch 15a, though shown in unit 23, is physically located in the fill line 15 leading to the tanks 10–13. Switch 15a is temperature sensitive and is normally closed. Switch 15a opens if the temperature of liquids in the fill line 15 falls below a predetermined level.

With relay coil of relay 128 energized, the signal lamp 128a is energized. The warning lamps 128b and 128c are de-energized.

In the unit 22 there are provided a six pole, double throw latching relay A and a five pole, double throw latching relay B. Relay A includes relay sections 130 and 131 with the relay section 130 shown de-energized so that the three armatures associated therewith are in the de-energized or lower position. The three armatures of the relay section 131 are in the energized or latched position. Latching arms associated with each of the relay sections 130 and 131 provide for alternate operation in a manner well-known in the art.

The second relay B includes the relay sections 132 and 133. Relay section 133 is shown de-energized with the section 132 in the energized position. Also in the circuit of unit 22 are two manually operable triple section switches 300 and 301 and two double section switches 302 and 303. A timer 140 is provided to control the minimum time interval during which the tank 10, once filled, must stand for conditioning before valve 17 can be again opened. Timer 140 has a pair of armatures 140a and 140b associated therewith which are actuated simultaneously and a third armature 140c operated in quadrature thereto. In the present example, timer 140 would actuate armatures 140a and 140b at six hour intervals if permitted to run continuously.

A high level liquid sensing and control channel includes the high level detector 20. An amplifier 150 serves, when energized, to actuate a control relay 151 which in turn closes a switch circuit leading from the bus 70 to a slave relay 152. Relay 152, in turn, closes a circuit through one of its controlled armatures to actuate a power control relay 153.

A valve operator 160 serves to control the valve 17 as well as three armatures of a triple pole, double throw switch 17a. The upper armature of switch 17a controls a motor in a timer 164. The unit 22 will operate to open valve 17 only when the circuit completed through contacts 164a is initially closed. Also provided is a timer 170 which is operated in connection with a valve control relay 171 to prevent the tank 10 from providing any indication of readiness to receive any additional fluids during the period following closure of valve 17 until the tank has been completely emptied and is ready to be filled.

The foregoing is but a general description of some components in the Battery Control unit 23 and the Tank 10 Control unit 22.

Having described in a general way the operating system and the functions to be performed thereby, there will now be given a more detailed description of various circuits and operative functions performed thereby.

First, reference will be made to the provision for a time delay at the time of system start-up. The system illustrated operates from the 117-volt supply 66 and includes some elements which require time for warm-up, particularly amplifier 150 and other circuit components which include thermionic devices. Assuming that all of the tanks 10–13 are empty, the application of power to the stepping relays 80 and 82, and particularly to the relay coil 84, is delayed a predetermined period of time, for example, for one minute by the automatic time clock 71. The energizing circuit for the clock motor 73 can be traced from the bus 70 through the upper armature 75a and then to ground.

The closure of switch 67 applies power to timer 110 which, after a time delay, closes contact 110b to energize relay 113. Power then is applied to the operator 120 to close the valve 62. By this means the overflow tank 60 is effectively disconnected from the line 15.

The particular tank of tanks 10–13 to be filled is selected from the control section 80 of the stepping relay. The stepping relay will operate to move the movable arm from one terminal to another and will continue to hunt until it finds a grounded contact. When line 80c is grounded, relay 86 will be energized, thereby opening the circuit leading from the power supply 88 to the stepping relay coil 84. Thus, the direct current path from the power supply 88 is interrupted at any time the armature of the stepping deck 80 moves into contact with a grounded lead. The ground circuit leading from terminal 80b may be traced by the path including conductor 80c which is connected to the middle contacts of the relay section 130, thence by way of conductor 80d, the lower armature of relay 153, conductor 80e, armature 140a of the timer 140, conductor 80f, armature 164a of the timer 164, and thence to ground terminal 164b.

In initiating operation, the armature 80a is in contact with the terminal 80b. The terminal 80b is already connected to ground as above described so the actuating coil 84 is immediately disconnected by operation of relay 86.

The armature 82a is connected to the terminal 82b. The feed section 82 is effective to supply power for the operation of the fill valve 17.

The power circuit for valve 17 includes bus 70, the lower armature of relay 171 and the conductor 200 which leads to one terminal of the valve operator 160, the other terminal of which is connected to ground. The relay 171 is controlled from the feed section 82, the energizing circuit being traceable as follows.

The bus 70 is connected through the armature 79a of the relay 79, armature 82a of the stepping relay section 82, switch 302b, the upper armature of the relay section 132, and the lower armature of the valve switch 17a which leads to one terminal of relay 171. The other terminal is connected to ground by way of conductor 171a and switch 122. When relay 171 is energized, both armatures are in the lower position in which state current can flow from the bus 70 through the lower armature and over conductor 200 to the operator 160.

The fill valve 17 begins to open when the operator 160 is energized. Immediately, the armatures of switch 17a are lowered to energize a fill signal lamp 17b. The second armature of switch 17a closes a circuit leading from bus 70 through armature 170a so that the operator 160 is now energized independently of the relay 171. The bottom armature of switch 17a moves to its lower position to open the energizing circuit for the relay 171. However, the valve 17 is held open by continued application of power by way of timer armature 170a.

When the bottom armature of switch 17a is in its lower position, power is applied by way of conductor 201 to the lower armature of the relay section 132 and then to the coil for relay section 133. This moves the armatures of section 133 up to the latched position opposite that shown in FIGURE 1. In this state the relay B is conditioned for energizing the coil for section 132 by closing switch 303a.

The time clock 164 functions to interrupt the connection to the ground terminal 164b if the valve 17 should fail to open within the time interval required for the armature 164a to be actuated by its associated cam.

More particularly, as power is applied to conductor 200 to energize operator 160, it is also applied by way of the upper armature in switch 17a to the motor of the timer 164. If the valve 17 does not open before the timer cam actuates the armature 164a, then the ground circuit for terminal 80b is removed and the stepping relay will move to another tank.

In the latter event, the stepping relay 80, 82 seeks another tank for filling and bypasses the tank 10. However, when the valve 17 opens, the upper armature of switch 17a opens the upper circuit position leading to the motor for clock 164 and the clock is automatically reset to the zero position and is ready for operation again when the valve 17 is selected for energization.

With the relay section 133 in the energized position, the armatures associated therewith are in the upper positions thereof. In this position the upper armature of relay section 133 applies power from the bus 70 to the valve operator 202 which operates the steam valve 44. A second operator 203 connected in parallel with operator 202 is powered through the upper armature of relay section 133 but under the secondary control of a relay 204 which is controlled by the water level sensing device 30. The operator 203 serves to open the bleeder valve 45.

It will also be noted that the lower armature of relay section 133 is positioned as to condition the relay section 132 to be energized. More particularly, a circuit is completed for the coil of relay section 132 from ground thence by way of the lower armature of relay 133, conductor 210, and the switch 303a, when closed. When the contents of tank 10 are to be shipped, the gauger manually closes the switch 303a to apply power to the coil of relay 132 which effectively resets the relay B so that it will be ready for response when tank 10 is again to be filled. Liquid will be shipped from the tank 10 under manual or other control of the gauger or of an automatic custody transfer system by way of suitable flow lines (not shown).

When the tank 10 is filled, the sensing probe 20 senses the high level of the liquid in the tank 10. The amplifier 150 then energizes relay 151. This in turn applies power to contact 151a to energize power control relay 152. When the relay 152 is energized, current flows from the bus 70 to a full signal lamp 10a by way of the upper armature of the relay 152. The upper terminal of power relay 153 is connected by way of conductor 212 to the conductor 212' leading from the time delay clock 71. It will be remembered that the contact 72 is closed by clock 71 so that power will be fed to the relay coil 153.

Power is applied by way of the upper armature of relay 153 to conductor 213 which leads to the armature 140b of the standing time clock 140. Immediately, the standing signal light 10b is energized. Also, power is applied by way of the armature 140b and conductor 214 to the motor of the clock 140. As the clock armature begins its movement, the armatures 140a and 140b drop to their lower positions, in which position the motor of clock 140 is powered dierctly from the bus 70. As the upper armature 140a opens, the circuit leading to the ground terminal 164b is broken.

As soon as the ground connection 164b is removed by the opening of the switch contact 140a, the relay coil 86 is de-energized. This closes the switch 86a to complete the circuit to coil 84 so that the armatures 80a and 82a begin to move stepwise in a clockwise direction until a ground point is found in one of the conductors leading from the section 80 to the control units for tanks 11, 12, or 13. Ordinarily, if the tank 11 is empty, this would be at the next contact 80g. If tank 11 is filled or if valve 18 does not open, the armature 80a will continue to move seeking a grounded terminal.

As the armature 82a moves from terminal 82b, it immediately removes power from conductor 82c, and thus will de-energize the valve relay 171. With the valve relay 171 de-energized, the armatures thereof move to the uppermost position. In such position the timer clock 170 is energized. The energizing circuit may be traced from the ground terminal leading to the motor, then to the armature 170b, the upper armature of relay 171, conductor 200, the middle armature of valve switch 17a and the armature 170a which is normally maintained in a closed circuit relation leading directly to the bus 70.

The purpose of the timer 170 is to provide a time delay between the opening of a valve, such as valve 18, and closure of the valve 17. The time delay for permitting closure of valve 17 is selected to be of sufficient length that the stepping relay 80, 82 can test at least two additional control systems. As soon as the timer 170 begins to operate, its cam moves in a counterclockwise direction.

The armature 170b makes contact with its lower terminal and this supplies the motor directly from the bus 70. When the cam of timer 170 is moved approximately 270°, the armature 170a is actuated. This removes power from the valve operator 160 by breaking the circuit leading to the middle armature of switch 17a. The valve 17 now closes. Armatures of switch 17a then return to their upper positions and the cam of the timer 170 reaches the position illustrated to remove power from the terminal in contact with armature 170b. In this condition the production from line 15 begins to flow into tank 11. Tank 10 is then standing to permit any water and contaminants to settle out.

A series of protective relays are provided in this system. Included is provision for opening the valve 62 when all of the tanks 11–13 are full. In carrying out this feature of the invention, the relays 91–94 are utilized. The relay 91 is energized immediately upon a signal being obtained from the high level sensing unit 22 indicating that tank 10 is full. Power to energize relay 91 is derived from conductor 214 by way of the upper armature of relay section 131 and the conductor 91a. When the relay 91 is energized, several functions are performed. One of the functions is to contribute to the conditioning of a circuit which will be energized when all of the tanks are filled. This circuit includes a plurality of serially connected contacts in relays 91–94. More particularly, the bottom armatures of each of relays 91–94, when in their lower positions, complete a circuit to energize relay coil 126 from bus 70, thereby turning on the signal lamp 126b indicating that all tanks are full. Additionally, the upper armature of relay 91, when in its lower position, applies power to one terminal of the relay 101, the other terminal of which is connected to ground. Relay 101 is one of a series of relays associated with manual operation of the system as hereinafter described. The effect of energizing relay 101 is to prevent hand operation of the "fill" instrumentation associated with tank 10. Actuation of relay 101 interrupts the circuit which might otherwise be closed by operation of the hand-operated switch 300b. Further, actuation of relay 101 removes one of a number of ground conditions which otherwise are associated with the conductor 240 which leads to the overflow tank relay 113. Normally, conductor 240 is connected to ground through the bottom armatures of each of the relays 101–104.

It will be remembered that the valve 62 must be energized to be closed. This is controlled by valve relay 113. Relay 113 initially is energized as described above and held in such condition once its armatures have been moved to the lower position. In such lower position power from bus 70 is applied by way of conductor 112, the upper armature of relay 113, and thence to one terminal of the coil of relay 113 whose other terminal is connected by way of the conductor 240 to ground through each of relays 101–104. The function of the timer 110 is to provide a time delay for the operation of the valve operator 120. When the timer 110 rotates in a clockwise direction, it closes the contact 110b to apply power to the relay 113. When the relay 113 operates, power is interrupted to the timer 110 by opening the contact associated with the upper armature of the relay. The timer 110 then automatically resets itself to the zero position.

When all the tanks have been filled, the ground paths normally provided by the relay contacts associated with relays 101–104 are removed. This de-energizes relay 113 and removes power from operator 120. Valve 62 will then open to direct the production into the tank 60.

Returning now to the control of the conditioning interval for the contents of tank 10, a six hour conditioning period has been found to be suitable for dehydration of production in given areas, placing it in a condition for acceptance by the pipeline. This interval may be changed to meet other local conditions. This interval is controlled by timer 140. It will be remembered that the timer 140 began operation as soon as the tank 10 was full. Thus, at the end of a selected interval of time, for example, six hours, the cam of timer 140, rotating counterclockwise, reaches a position approximately 270° from the position illustrated. In this position it actuates armature 140c. Armature 140c applies power by way of the lower armature of relay section 131 to energize section 130 which moves all the contacts associated with that relay to positions opposite to that illustrated. Power is now applied from bus 70 by way of the upper armature of section 131 and conductor 91a to hold relay 91 in an energized condition. In addition, power is applied by way of the center armature of section 131 to light the shipping light 10c which signals to an attendant that the contents of tank 10 are ready for shipment. The same signal may be employed in automatic transfer systems if desired.

The opening of the center armature of section 130 removes the ground from the control section contact 80b. Ground cannot be again applied to the contact 80b until after the production contained in tank 10 has been shipped or latch relay section 131 has been energized to recondition the system associated with tank 10 for another filling operation. The lower armature of section 130 is now in its upper position to condition the section 131 for energization upon the closure of the switch 302a which, it will be remembered, is operated by the attendant or another programmed control system performing the shipping operation. The circuit for the energization of the relay section 131 may be traced from ground through its coil, which is connected to the lower armature on section 130, thence to the center armature on section 132.

It will be noted that at this time section 132 is de-energized so that the contacts are in a position other than the one illustrated. The section 132 may now be energized by an attendant by closing switch 303a. Following this, all armatures of sections 130–133 are in their illustrated positions.

The steam valve 44 is closed and the control system for the conductive probe 30 is de-energized when the attendant operates the switch 303a. The relays 101–104 are instrumental in automatically seeking an empty tank should it be desired to close the input valve 18, controlling the flow of liquid to the tank 11. It will be remembered that relay 101 previously has been energized upon filling of the tank 10. To close the valve 18, a switch in Tank 11 Control unit corresponding with switch 301c is closed to energize conductor 92a. As a result, power is applied from line 255, which line is always hot as long as switch 302a and its counterparts are closed and they will be closed in each unit so long as the unit is placed in condition for "automatic fill." Relay 102 is then energized. Also closed at the same time are switches 301a and 301b. The closure of switch 301a applies power to the upper armature of relay 102. This armature being in its lower position applies power to the upper armature of the next relay 103 and from there to the upper armature of relay 104 to apply power to the valve relay associated with tank 12. Such valve relay being energized then is effective to open the valve 19 to permit production to flow into tank 12. The closure of switch 301b energizes relay 79 which removes power from the arm 82a by opening contact 79a.

The removal of power from the section 82, of course, de-energizes the relay in Tank 11 Control unit corresponding with relay 171 which in turn effects the closure of fill valve 18 in the manner described above in conjunction with the valve 17.

Assume for the purpose of description that the tank 10 is not filled but the valve 18 is to be opened for flow of production into the tank 11. Valve 18 is opened by closing the switches 300a, 300b and 300c. The closure of switch 300b immediately energizes relay 79 which removes power from the section 82. This in turn, of course, de-energizes the valve relay 171 and begins the closure operations for the fill valve 17. The switch 300c when closed applies power over lines 251 and 252 to the valve control relay 171 associated with control valve 17. A similar circuit is available in Tank 11 Control unit to open valve 18 since the portion of the circuit shown in FIGURE 1 is duplicated for each group of tanks whereas the portion of the circuit of FIGURE 2 is common to all the tanks.

By way of example, the reset timers 71 and 110 may be of the type MAR Automatic Reset Timers available from Aemco Incorporated of Mankato, Minnesota, identified as Model No. MARD-5M. This timer is fully adjustable up to five minutes and automatically will reset itself. The stepping relay 80, 82 is the type 20 which available from C. P. Clare and Company of Chicago, Illinois, and illustrated in their 1960 catalog entitled "Stepping Switches Types 210, 211, 200, 20, 26, and Direct Drive." The latching relays 130–133 are of the type available from Potter and Brumfield, a division of American Machine and Foundry Company, Princeton, Indiana, identified in May 1960, Stock Catalog 100 as Special Purpose Relays, Type KB23AG, Six Pole Double Throw.

Probes 20 and 30 as used with electronic means to actuate relays 151 and 204 may be of the type disclosed in Patent No. 2,720,624 to Gurst et al. and Patent No. 2,863,472 to Coles et al.

It will be seen from the foregoing that the present invention involves control of a flow system for a tank battery wherein each of a plurality of tanks is connected to a common supply line by way of a valve having an operator. A separate energizing means is coupled to each operator. Each energizing means is operable when in a fill condition for transmission of energy to its operator to open one of the valves. A search means including stepping relays is provided for sequentially sensing the condition in each of the separate energizing means and is responsive to the first fill condition encountered to apply energy to a first operator to initiate flow to a first tank. Sensing means in each tank is provided for indicating a full condition. Means responsive to the sensing means at full condition actuates the search means to seek an empty tank and thereafter de-energize the first operator. While the invention has been described as applicable to the control of liquid flow systems wherein a conditioning period is desired before delivery from the storage tanks in the storage battery, it will be understood that the control system is applied to fluids other than liquids so that an uninterrupted flow may be accommodated through the use of the tank battery with a selective overflow tank and with predetermined time intervals between opening of a second valve and closing of a first valve leading to separate tanks. The control system has been illustrated as entirely electrically operated. However, it is to be understood that valve operators other than electrically energized operators may be employed. For example, pneumatic and electropneumatic systems are well-known in the art and may be employed in place of the electrically actuated fill valve operator 160.

Having described the invention in connection with certain specific embodiments thereof, it is to be understood that further modifications may now suggest themselves to those skilled in the art and it is intended to cover such modifications as fall within the scope of the appended claims.

What is claimed is:

1. A flow control system for a tank battery wherein each of a plurality of tanks is connected to a common supply line by way of a valve having an operator, which comprises:
   (a) a separate energizing circuit coupled to each said operator operable in a fill condition for transmission of energy to said operator,
   (b) search means for sequentially sensing the condition in each said separate energizing circuit and responsive to a fill condition to apply said energy to a first operator to initiate flow to a first tank,
   (c) sensing means in each tank for indicating a full condition,
   (d) means responsive to the sensing means at full condition to actuate said search means, and
   (e) a timer responsive to said sensing means at full condition to modify said fill condition in the energizing circuit leading to said first operator.

2. The combination set forth in claim 1 in which the period of said timer is at least as great as two cycles of said search means.

3. A flow control system for a tank battery wherein each of a plurality of tanks is connected to a common supply line by way of a valve having an operator, which comprises:
   (a) a separate energizing circuit for each said operator operable in a fill condition and including a relay having one tunnel connected to ground and when energized controlling transmission of energy to said operator,
   (b) search means for sequentially sensing the condition in each said separate energizing circuit and responsive to a grounded circuit to energize said relay to apply energy to a first operator to initiate flow to a first tank,
   (c) sensing means in each tank for indicating a full condition,
   (d) means responsive to the sensing means at full condition to open said grounded circuit to actuate said search means, and
   (e) a timer responsive to de-energization of said relay to de-energize said first operator a predetermined time interval after said grounded circuit is opened.

4. A flow control system for a tank battery wherein each of a plurality of tanks is connected to a common supply line by way of a valve having an operator, which comprises:
   (a) a separate energizing circuit for each said operator and including a relay controlled path for transmission of energy to said operator,
   (b) a secondary normally open path coupled to said operator closed by said operator for feeding said operator independently of said relay controlled path,
   (c) search means for sequentially sensing the condition in each said separate energizing circuit and responsive to a grounded circuit to energize said relay to apply energy to a first operator to initiate flow to a first tank and to close said secondary path, (d) sensing means in each tank for indicating a full condition, (e) means responsive to the sensing means at full condition to open said grounded circuit to actuate said search means, and (f) a timer controlled by said relay and operative upon de-energization thereof to open said secondary path a predetermined time interval after said grounded circuit is opened to de-energize said first operator.

5. A flow control system for a tank battery wherein each of a plurality of tanks is connected to a common supply line by way of a valve having an operator, which comprises:

(a) separate energizing circuits coupled to each said operator with each circuit operable in a fill condition for transmission of energy to its operator, (b) search means for sequentially sensing the condition in each of said separate energizing circuits and responsive to a fill condition to apply said energy thereto, (c) timers for each of said circuits responsive to application by said search means of energy thereto for modifying said fill condition after a predetermined time interval, and (d) timer control means for each of said timers responsive to opening of a given valve by its operator to de-energize and reset said timers.

6. A flow control system for a tank battery wherein each of a plurality of tanks is connected to a common supply line by way of a valve having an operator, which comprises:

(a) an electrical source, (b) a stepping relay having a first input circuit connected to said source and having a separate output circuit leading to each said operator including a particular operator associated with the first said separate output circuit for applying power to the separate output circuits sequentially and having a second circuit for controlling the application of actuating power to said stepping relay, (c) an operator control circuit for each said operator, (d) circuit means including auxiliary relays and latching relays connected in series circuit relation in a path through and controlled by said latching relays and extending to said stepping relay, (e) a power circuit extending from said source to each said operator by way of switching means in said auxiliary relays, (f) a timer, (g) a supply circuit for actuation of said timer responsive to high fluid level in the tank controlled by said particular operator for modifying the state of said second circuit of said stepping relay thereby to change the conductive path leading from said first input circuit to include a second separate output circuit, and (h) a switch in said first separate output circuit actuated by said timer a predetermined interval after actuation of said stepping relay to interrupt said first separate output circuit thereby to de-energize said particular operator to close the valve associated therewith.

7. A system for selectively controlling the flow of liquid from a common line into tanks forming a multiple tank battery wherein each of said tanks has a high fluid level indicator and communicates with said line by way of a valve having an operator, which comprises:

(a) an electrical source, (b) an energizing circuit for supplying energy to each said operator, (c) a battery control unit for connecting said source to one said energizing circuit to actuate the operator of a first valve to initiate flow to a first of said tanks, (d) a circuit responsive to the high level indicator for said first of said tanks to actuate said battery control unit to connnect said source to a second said energizing circuit thereby energizing the operator of a second valve, and (e) time delay means to disconnect the energizing circuit for the operator of said first valve from said source.

8. A system for selectively controlling the flow of liquid from a common line into tanks forming a multiple tank battery wherein each of said tanks has a high fluid level indicator and communicates with said line by way of a valve having an electrical operator, which comprises:

(a) an electrical source, (b) an energizing circuit connected to each said operator, (c) a stepping relay for sequentially connecting said source to the energizing circuits to energize the operator of a first valve to initiate the flow to a first of said tanks and to succeeding tanks, and (d) a timer circuit actuated in response to the high level indicator for said first of said tanks to actuate said stepping relay to connect said source to a second energizing circuit thereby to energize the operator of a second valve and thereafter to disconnect the energizing circuit for the operator of said first valve from said source.

9. The combination set forth in claim 8 in which said stepping relay includes a first channel connected at its input to said source and having output lines connecting output terminals thereof in ordered sequence to the energizing circuits and a second channel for control of stepping relay actuating power from said source.

10. A flow control system for a tank battery wherein each of a plurality of tanks is connected to a common supply line by way of a valve having an operator, which comprises:

(a) an electrical source, (b) a stepping relay having a first input circuit connected to said source and having a separate output circuit leading to each said operator for applying power to the separate output circuits sequentially and having a second circuit for controlling the application of its actuating power, (c) an operator control circuit associated with each said operator including latching relays, each said output circuit including a path through and controlled by one latching relay and an auxiliary relay connected in series, (d) a normally de-energized timer connected to be energized from said electrical source in response to a high fluid level in the tank controlled by a first operator for simultaneously actuating said second circuit of said stepping relay to apply power from said supply line to a second said separate output circuit and through a second conductive path through said one latching relay in a first output circuit to energize the same for altering the state thereof, and (e) a switch in said first output circuit actuated by said timer a predetermined interval after actuation of said stepping relay to interrupt said first output circuit for de-energizing the operator associated therewith.

11. The combination set forth in claim 10 in which said common supply line is connected to an overflow tank by way of a valve normally biased open and wherein a circuit leads from said electrical source to an operator for the normally open valve to maintain the same closed with means responsive to a high level in all of the tanks of said battery and to failure of any of the valve operators to open valves leading to the tanks of said battery to de-energize and open said normally open valve.

12. A flow control system for a tank battery wherein each of a plurality of tanks is connected to a common supply line by way of a valve having an operator, which comprises:
- (a) separate energizing circuits coupled to each said operator with each energizing circut operable in a fill condition for transmission of energy to its operator,
- (b) search means for sequentially sensing the condition in each of said separate energizing circuits and responsive to a fill condition to apply said energy to a first operator to initiate flow to a first tank,
- (c) an overflow tank connected to said line by way of a reserve valve which is normally biased open,
- (d) a circuit for energizing said reserve valve to maintain it closed,
- (e) sensing means in each tank for indicating a full condition,
- (f) means responsive to the sensing means at said full condition to actuate said search means to search for an empty tank, and
- (g) means responsive to sensing means in all of said tanks at full condition to de-energize said reserve valve for initiating flow to said overflow tank.

References Cited in the file of this patent
UNITED STATES PATENTS

| | | |
|---|---|---|
| 2,605,780 | Nance | Aug. 5, 1952 |
| 2,824,569 | Wright | Feb. 25, 1958 |

UNITED STATES PATENT OFFICE
CERTIFICATE OF CORRECTION

Patent No. 3,151,625                                                              October 6, 1964

William G. Keeney, Jr.

It is hereby certified that error appears in the above numbered patent requiring correction and that the said Letters Patent should read as corrected below.

Column 1, line 9, for "The" read -- This --; column 4, lin 36, after "With" insert -- the --; column 6, line 32, after "133" insert -- latched --; line 73, for "dierctly" read -- directly --; column 9, line 43, for "which" read -- switch --; column 13, line 4, for "circut" read -- circuit --.

Signed and sealed this 2nd day of March 1965.

(SEAL)
Attest:

ERNEST W. SWIDER                                                EDWARD J. BRENNER
Attesting Officer                                                  Commissioner of Patents